ABSTRACT

United States Patent [19]

Budecker

[11] 4,016,895
[45] Apr. 12, 1977

[54] FLOW CONTROL VALVE

[75] Inventor: Ludwig Budecker, Frankfurt, Germany

[73] Assignee: International Telephone and Telegraph Corporation, New York, N.Y.

[22] Filed: Aug. 29, 1975

[21] Appl. No.: 608,844

[30] Foreign Application Priority Data

Aug. 30, 1974 Germany .......................... 2441662

[52] U.S. Cl. ............................... 137/101; 137/115; 137/118
[51] Int. Cl.[2] ........................................ G05D 15/00
[58] Field of Search .......... 137/115, 116, 117, 118, 137/119, 101

[56] References Cited

UNITED STATES PATENTS

| | | | |
|---|---|---|---|
| 3,011,506 | 12/1961 | Schwartz et al. ............... | 137/117 X |
| 3,575,192 | 4/1971 | MacDuff ........................ | 137/117 X |
| 3,687,152 | 8/1972 | Osaka ............................. | 137/115 |
| 3,692,039 | 9/1972 | Ewald et al. ................... | 137/118 |
| 3,703,186 | 11/1972 | Brewer ........................... | 137/118 X |
| 3,915,186 | 10/1975 | Thomas .......................... | 137/117 X |

*Primary Examiner*—William R. Cline
*Attorney, Agent, or Firm*—James B. Raden; William J. Michals

[57] ABSTRACT

A flow control valve for controlling the output at first and second delivery ports in response to the output of a single pump connected to the inlet port of the valve, is disclosed. The valve includes a stepped bore the reduced portion of which is adjacent the inlet port and receives an operating piston having an axial bore therein. The larger portion of the stepped bore receives an auxiliary differential piston having an axial bore which sealingly receives the projecting end of the operating piston. The operating piston is spring-biased toward the inlet port, and the auxiliary piston is spring-biased toward the other end of the stepped bore. The projecting end of the operating piston is provided with a restricted opening which communicates with the first delivery port. The larger portion of the stepped bore is provided with a relatively large opening which is spaced from the other end thereof and which communicates with the second delivery port. The first delivery port also communicates with an intermediate opening in the stepped bore and near the transition of the stepped bore. The reduced portion of the stepped bore communicates with a discharge opening of the valve when the operating piston is translated away from the inlet port. At low pump pressures, the pump communicates with the first delivery port through the axial bore of the pistons. Increased pressure translates the auxiliary piston thereby exposing the large opening to the pump output. A further increase in pump pressure translates the operating piston thereby to divert the excess pump output through the discharge opening of the valve.

8 Claims, 2 Drawing Figures

FLOW CONTROL VALVE

BACKGROUND OF THE INVENTION

1. Field of the Invention

This invention relates to a flow control valve having an operating piston which is sealingly movably arranged in a bore and defines in the bore an inlet chamber connected to a pump and a control chamber connected to a work port of a slave unit, with the operating piston being prestressed by a governing spring in the direction towards the inlet chamber, said governing spring being arranged in the control chamber, and wherein the inlet chamber has a return-aperture connected to a reservoir, which return aperture can be closed by the operating piston, and wherein the inlet chamber is connected with the control chamber by a by-pass line wherein a restrictor is provided.

2. Description of the Prior Art

Such flow control valves are generally known and are used in pressure fluid systems wherein the pump does not deliver a constant pressure fluid quantity although the dependant unit requires a certain pressure fluid flow within certain tolerances independant of the pressure. The different delivery quantity of the pump is for example caused by the fact that in a pressure fluid system in automotive vehicles, the pump is driven by the engine of the automotive vehicle with highly varying rotational speeds. In this method, the pump is dimensioned in such a way that even with no-load speeds of the engine, the necessary pressure fluid quantity is delivered. With quick movmement of the automotive vehicle and the consequent considerably higher rotational speed of the engine, the delivery flow of the pump increases many times over. This highly increased delivery flow, however, can no longer be fed to the dependant unit. Therefore, it is delivered via a flow control valve of the initially named type, which — independant of the pressure — passes on a certain constant delivery flow to the dependant unit and leads the excess quantity back to the reservoir.

It is an essential feature of these known flow control valves that the pump must only deliver against a pressure level which is insignificantly higher than the pressure level momentarily required at the connection to the dependant unit. For instance in dependant circulation units the pressure fluid can flow through nearly without pressure when the dependant circulation unit is not actuated. In this method, the flow control valve as well responds already under a very low pressure and discharges the excess quantity to the reservoir, also without pressure. If the dependant circulation unit is actuated, the pressure fed to it will increase. The flow control valve guarantees that a constant volume flow is fed to the dependant unit furtheron and that the excess quantity is discharged to the reservoir.

But it is an essential disadvantage of the known flow control valve that only one dependant unit can be supplied with pressure fluid at a time.

SUMMARY OF THE INVENTION

It is the object of this invention to provide a flow control valve of the initially named type wherein the overall pressure fluid flow fed to two separate dependant units is controlled and wherein the excess quantity delivered by the pump is discharged to the reservoir, and wherein a certain portion of the overall pressure fluid flow is primarily fed to one of the two dependant units. The delivery pressure of the pump is not to considerably exceed the dependant unit pressure required respectively.

This object is reached in a flow control valve of the initially named type in that the bore is stepped, with the inlet chamber and the return aperture being provided in the contracted part of the bore, and in that in the expanded part of the bore a sealingly slidable auxiliary operating piston with an auxiliary governing spring is arranged, which auxiliary operating piston has an axial bore, and in that the operating piston sealingly projects into the contracted part of the bore and at the same time into the axial bore, and in that a control chamber between the contracted part of the bore and the auxiliary operating piston is connected to the connection to the dependant unit opening into the control chamber in front of the auxiliary control piston, while a second restrictor is arranged in the connection to the dependant unit, and in that a secondary connection to the dependant unit which can be closed by the auxiliary operating piston opens into the control chamber.

Thus, a flow control valve for the pressure fluid supply of two separate dependant units is provided, which flow control valve permits the manufacture of a highly compact model and supplies both dependant units with a controlled pressure fluid flow. In this method, the operating piston ensures that at first only a certain overall pressure fluid flow gets into the control chamber and that the excess delivery quantity of the pump is discharged directly to the reservoir again. A certain pressure fluid quantity of this overall pressure fluid flow, which got into the control chamber, is at first fed to a first dependant unit primarily via the connection to the dependant unit. Only when this pressure fluid quantity flows to the first dependant unit, is the secondary connection to the dependant unit opened by the auxiliary operating piston so that the remaining part of the overall pressure fluid flow flows to the second dependant unit. It is especially advantageous that the pump has to deliver only against a pressure level which is only insignificantly higher than the pressure level momentarily required at a dependant unit.

In an advantageous embodiment it is provided that the by-pass line is arranged in the operating piston and that the inlet chamber is connected to the control chamber by the operating piston and the auxiliary operating piston.

From this there ensues that less pressure fluid channels are necessary in the housing surrounding the operating piston and the auxiliary operating piston so that an especially space-saving model can be manufactured. Moreover, manufacture becomes especially simple.

It is provided in another embodiment that a pressure-relief valve is connected to the connection to the dependant unit after the second restrictor. This guarantees that the function of the auxiliary operating piston is ensured also in case no pressure fluid can flow through the first slave unit, for instance in consequence of a failure at the latter. It is ensured as well that the work pressure at the first dependant unit, e.g. with excessive actuation, cannot exceed a certain value.

In an especially advantageous embodiment it is provided that a line by which the connection to the dependant unit is connected to the control chamber can be closed by a 3-way, 2-position auxiliary directional control valve, while at the same time the control chamber can be connected to the reservoir without pressure, and that the line between the second restrictor and a check valve inhibiting flow in the direction towards the control chamber opens into the connection to the dependant unit.

From this there ensues that the inventive flow control valve is designed at the same time as accumulator charging valve for the first dependant unit requiring pressure fluid in an amazingly simple manner. As dependant units with pressure fluid accumulators do not need a permanent pressure fluid flow, it is advantageously possible in this embodiment to open the secondary connection to the dependant unit completely without that a pressure fluid flow has to flow through the restrictor of the connection to the dependant unit. Consequently, the pump need not deliver against the pressure level of the relief-valve jet when the accumulator is filled in case the pressure of the secondary dependant unit is lower. Thus, it is achieved that the pump must only deliver against the pressure level of the second dependant unit when no pressure fluid is required at the first dependant unit which is provided with the pressure fluid accumulator.

In this method, it is also advantageous that the auxiliary valve is controlled by the pressure in the connection to the dependant unit behind the check valve. Consequently, the accumulation charging process is automatically controlled by the auxiliary valve provided in the flow control valve without that further elements are needed.

If using the flow control valve with a pressure fluid accumulator, it is especially advantageous that the flow control valve, the pump and the pressure fluid accumulator are formed as one sole device. Owing to this integral formation, the whole arrangement becomes more silent, as the pressure fluid accumulator of the first slave unit, which exclusively works in the higher pressure region, is disposed immediately at the pump, and consequently pressure pulsations are not radiated to an increased degree by lines.

BRIEF DESCRIPTION OF THE DRAWINGS

Further advantages of this invention become apparent from the following description and the attached drawings showing in FIG. 1 an embodiment of the inventive pressure control valve for two slave units requiring pressure fluid, working according to the circulation principle.

DESCRIPTION OF PREFERRED EMBODIMENTS

Figure 1:
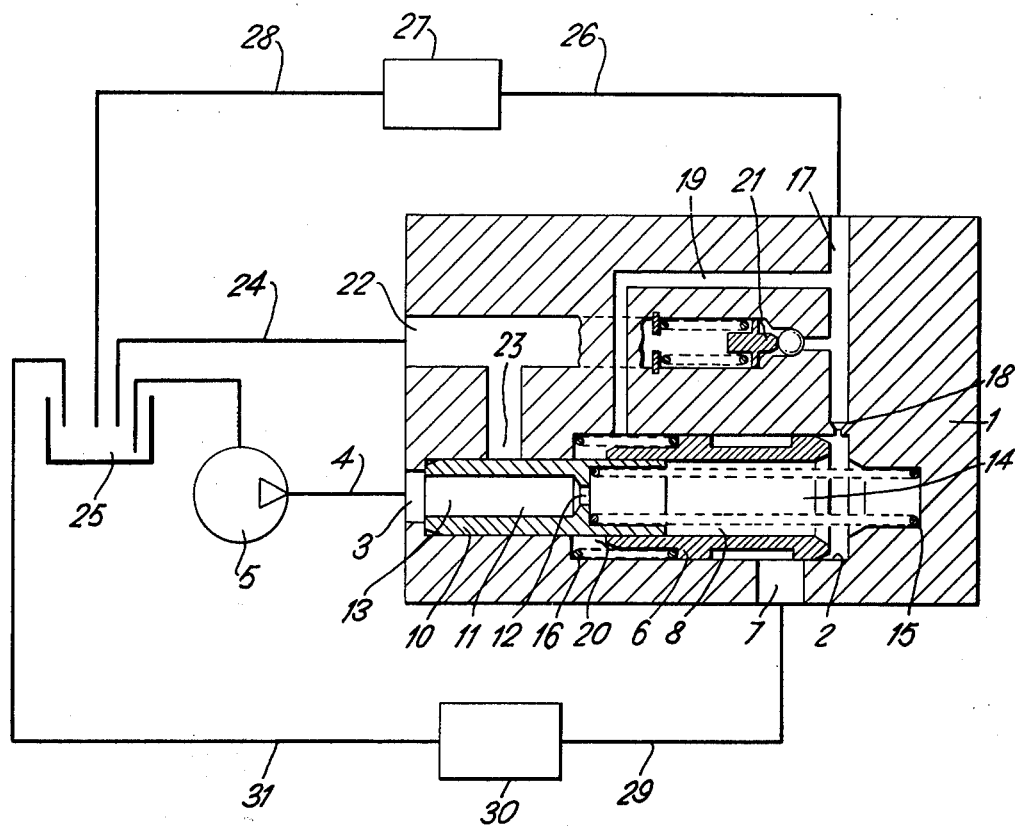

A housing 1 has a stepped bore 2 in the contracted part of which an end-face inlet aperture 3 is provided which is connected to a pump 5 via a line 4. In the expanded part of the stepped bore 2, an auxiliary operating piston 6 is arranged sealingly slidingly by which a secondary connection to the work port 7 can be closed. The auxiliary operating piston 6 has an axial bore 8 the diameter of which corresponds to the contracted part of the stepped bore 2. An operating piston 10 is sealing slidingly guided in the contracted part of the stepped bore 2 and in the axial bore 8 of the auxiliary operating piston 6. A by-pass line 11 with a restrictor 12 is provided in the operating piston 10.

An inlet chamber 13 in the contracted part of the stepped bore 2 is defined by the operating piston 10. This inlet chamber 13 is connected via the by-pass line 11 with a control chamber 14 which is disposed in the expanded part of the stepped bore 2 in front of the auxiliary operating piston 6. The operating piston 10 is prestressed by a spring 15 in the direction towards the contracted part of the stepped bore 2.

Between the auxiliary operating piston 6 and the contracted part of the stepped bore 2, an annular control chamber 20 is defined with the help of the operating piston 10, in which control chamber 20 an auxiliary governing spring 16 is arranged which is supported at the stepping of the bore 2 on the one hand and at the auxiliary operating piston 6 on the other hand.

A connection to a work port 17 has a second restrictor 18 at the place where it opens into the control chamber 14. The connection to the work port 17 is connected also to the control chamber 20 via a channel 19. Moreover, a relief-valve jet 21 is connected to the work port 17, said relief-valve jet in turn being connected to a return connection 22. Moreover, a return aperture 23 is connected to the return connection 22, said return aperture opening radially into the inlet chamber 13 defined in the contracted part of the stepped bore 2.

The return connection 22 is connected to a reservoir 25 via a line 24. The work port 17 is connected via a line 26 with a first dependant, or slave, unit 27 working according to the circulation principle, said slave unit 27 in turn being connected with the return reservoir 25 again via a line 28. The secondary connection to the work port 7 is connected via a line 29 to a second slave unit 30 working according to the circulation principle as well. The latter in turn is connected to the reservoir 25 via a line 31.

The first slave unit for instance can be a brake booster and the second one for instance a servo steering. The demand made in the object of this invention that the first slave unit has to be supplied with pressure fluid primarily becomes obvious because a failure of the brake boosting system has by far graver consequences than a failure of the servo steering in case the pressure fluid flow of the pump should only be sufficient for one slave unit for any reasons whatsoever at any time.

The inventive flow control valve according to FIG. 1 works as follows:

Before the pump 5 is put into operation, all parts of the flow control valve are essentially in the illustrated position, i.e. the return aperture 23 is closed by the operating piston 10, while the secondary connection to the work port 7 is closed by the auxiliary operating piston 6. When the pump 5 starts to deliver pressure fluid, it will flow into the inlet chamber 13 through the bypass line 11 and the restrictor 12 into the control chamber 14. As the delivery flow of the pump 5 is low in the first instance, the pressure difference occurring at both sides of the operating piston 10 in consequence of the restrictor 12 does not suffice to shift the operating piston 10 against the force of the governing spring 15 to the right, as seen in the drawing. The length or spring constant of governor spring 16 is preferably selected such that even a low initial pressure flow translates auxiliary operating piston 6 to the position illustrated in FIG. 1. That is, the initial low pressure flow is sufficient to act upon the right-hand portion of auxiliary piston 6 to translate is sufficiently to cause restrictor 18 to be in communication with control chamber 14; and, such operation is ensured by selecting a suitable spring constant, or by selecting the extended spring length of spring 16 to be that which is exemplified in the drawing figures, or by any other suitable means.

The pressure fluid which got into the control chamber 14 now flows to the first slave unit 27 via the restrictor 18 and the connection to the work port 17. In this process, no significant pressure difference occurs again between control chamber 14 and the connection to the work port 17 with little pressure fluid flow in consequence of the restrictor 18. Consequently, the same pressure always acts in the control chamber 20 as in the control chamber 14 as the control chamber 20 is connected to the work port 17 via the channel 19. From this there ensues that the auxiliary operating piston 6 is held in the illustrated position by the auxiliary governing spring 16. It is also not shifted during an actuation of the slave unit 27 requiring pressure fluid and the consequent pressure rise in the connection to the work port 17 as long as the pressure fluid flow at the second restrictor 18 does not cause a significant pressure difference.

When the pressure fluid flow through the second restrictor 18 reaches the predetermined value, a pressure difference will occur between the control chamber 14 and the connection to the work port 17. This pressure, which is somewhat lower in the connection to the work port 17, is also present in the control chamber 20. From this there ensues that the auxiliary operating piston 6 is supplied by a lower force in the control chamber 20 than in the control chamber 14. The auxiliary operating piston will move to the left as seen in the drawing so that the secondary connection to the dependant unit is opened to such an extent that pressure fluid can flow to the second dependant unit 30 and that nevertheless the pressure fluid flow to the first dependant unit, given by the restrictor 18, is maintained.

It is to be indicated that this process is independant of the absolute pressure in the first slave unit. If for instance none of the slave units is actuated, only a very low pressure accumulated by the restrictor 18 is also present in the control chamber 14 as well in order that the auxiliary operating piston is shifted and opens the secondary connection to the work port 7. With an actuation of the first slave unit 27 and the consequent pressure rise in the connection to the work port 17, the work port 7 is only opened when, despite the increased pressure, the predetermined pressure fluid quantity flows to the first slave unit 27.

If for instance the pressure fluid flow through the first slave unit 27 was locked in consequence of a failure at this slave unit 27, no pressure fluid flow at the restrictor 18 would be possible without the excess-pressure valve 21, which would also lead to the fact that the pressure difference between control chamber 14 and control chamber 20 necessary for shifting the auxiliary operating piston would not be reached. In addition to performing a security function for the first slave unit 27, the pressure-relief valve 21 permits a pressure fluid flow through the second restrictor 18 also in this special case, resulting in the auxiliary operating piston 6 opening the secondary connection to the work port 7 even with a failure at the first slave unit 27.

With increasing rotational speed of the pump 5, the delivery flow of the pump 5, fed into the inlet chamber 13, exceeds the need for pressure fluid of the two slave units 27 and 30. In this case, a pressure difference occurs between control chamber 14 and inlet chamber 13 on grounds of the restrictor 12. Owing to this pressure difference, the operating piston 10 is shifted to the right against the force of the governing spring 15, as seen in the drawing. In this process, the return aperture 23 is opened to such an extent that the excess quantity delivered by the pump 5 is discharged to the return connection 22 and then to the reservoir 25.

Figure 2:
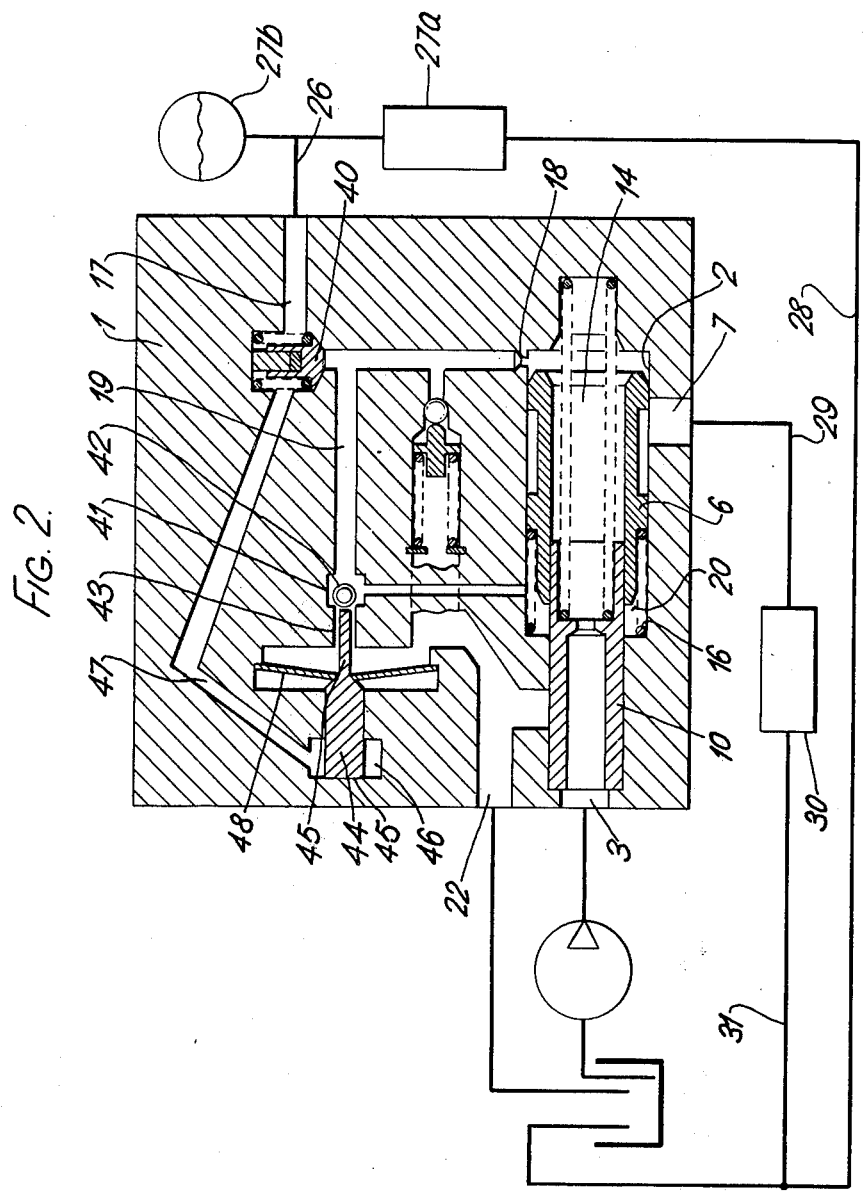
FIG. 2 another embodiment of this invention wherein the inventive flow control valve is designed at the same time as accumulator charging valve for one dependant unit.

In the flow control valve according to FIG. 2, a stepped bore 2 with an operating piston 10 disposed therein and an auxiliary operating piston 6 is provided in the housing 1. This arrangement is identical to the one of FIG. 1 so that a repeated description of these parts can be dispensed with.

Other than in FIG. 1, a check valve 40 inhibiting flow in the direction of the control chamber 14 is provided in the connection to the work port 17. Moreover, the connection channel 19 is lead via a 3-way, 2-position auxiliary directional control valve 41 by which the connection to the control chamber 20 and to the connection to the work port 17 can be closed and at the same time the control chamber 20 can be connected to the return connection 22. Preferably, the 3-way, 2-position auxiliary directional control valve 41 is designed as ball valve and has a valve ball 42 which is pressed onto a return line 43 with the help of the pressure fluid and closes said return line. In this position, there is pressure fluid connection between the control chamber 20 and the connection to the work port 17. The valve ball 42 can be pushed onto a aperture of the pressure fluid channel 19 by a tappet 45 which is firmly connected to an operating piston 44 and projects through the return line 43. In this position, there is pressure fluid connection between the control chamber 20 and the return connection 22.

The operating piston 44 projects with its end 49 distant from the valve ball 42 into a control chamber 46 which is connected to the connection to the work port 17 via a channel 47. It has to be noticed that the channel 47 opens into the connection to the work port 17 after the check valve 40, while the pressure fluid line 19 opens into the connection to the work port 17 between the check valve 40 and the second restrictor 18.

A slave unit 27a and a pertinent pressure fluid accumulator 27b are connected to the work port 17 via a line 26 in this case. The chamber 46 is in permanent connection with the pressure fluid accumulator 27b.

The operating piston 44 applied by the accumulator pressure in the chamber 46 is supported in opposite direction at a cup spring 48 with negative characteristic. Thus, it is achieved that the operating piston 44 does not move to the right, as seen the the drawing, before the ceiling switching pressure in the pressure fluid accumulator 27b has been reached, and presses the valve ball 42 onto the pressure fluid line 19. The operating piston 44 rests in this switch position until the pressure level in the pressure fluid accumulator 27b has fallen to the floor switching pressure. In this moment, the operating piston 44 moves to the left, as seen in the drawing, and the valve ball 42 is pushed again onto the return line 43 and closes the latter so that the control chamber 20 is connected to the connection to the work port 17 again.

The functioning of the operating piston 10 and the auxiliary operating piston 6 is the same as in the embodiment of FIG. 1 at first when both dependant units require pressure fluid. If the ceiling switching pressure has been reached in the pressure fluid accumulator 27b, no further need for pressure fluid is present at the connection to he work port 17. As described above, the operating piston 44 is shifted to the right in this case, as seen in the drawing, resulting in the valve ball 42 being pressed onto the connection line 19. Therewith, the control chamber 20 is connected to the return connection 22 without pressure. No pressure difference is caused by the second restrictor 18 is necessary to shift the auxiliary operating piston 6 so that no pressure fluid must flow through this restrictor 18 in order that the auxiliary operating piston 6 can work duly. On the contrary, a very low absolute pressure in the control chamber 14 is sufficient to shift the auxiliary operating piston 6, in order to shift the auxiliary operating piston against the force of the auxiliary governing spring 16 to the left, as seen in the drawing, and to open the secondary connection to the work port 7.

If the pressure in the pressure fluid accumulator 27b falls to the floor switching pressure, the operating piston 44 is brought into its initial position by the cup spring 48, and consequently the connection of the control chamber 20 to the return connection 22 is closed again, and the connection line 19 is opened. As there is now a connection between the control member 20 and the connection to the work port 17 again, the auxiliary operating piston 6 closes the secondary connection to the work port 7 for such a long time until a predetermined pressure fluid flow flows to the connection to the work port 17, and, thus, the pressure fluid accumulator 27b is charged.

I claim:

1. A flow control valve for controlling the output of first and second delivery ports thereof in response to the output of a pump at the input thereof, said control valve comprising, in combination:
    a valve body having an inlet port for receiving the output of said pump and said valve body having a discharge port thereon;
    said valve body having a stepped bore therein extending from said inlet port and into said valve body and wherein the reduced diameter portion of said stepped bore is adjacent said inlet port;
    a first piston slidably mounted in the other portion of said bore and translatable therein and said first piston having an axial bore therethrough;
    a second piston slidably mounted in said reduced diameter portion of said stepped bore and extending into said axial bore of said first piston in telescopic relationship therewith, said second piston being translatable in said reduced portion of said stepped bore and said axial bore of said first piston, and said second piston having an axial bore extending therethrough which terminates in a restricted opening at the inner end thereof;
    means for urging said pistons away from each other;
    a first passageway coupling said first delivery port to a restricted opening in a wall portion of said stepped bore adjacent the inner end of said other portion of said stepped bore wherein said first delivery port communicates with said axial bore of said first piston;
    a second passageway coupling said second delivery port to an opening at an intermediate portion of said other portion of said stepped bore wherein said second delivery port communicates with said axial bore of said first piston when said first piston is translated a given distance toward said second piston in response to the output pressure of said pump exceeding a predetermined value; and,
    a third passageway coupling said discharge port of said valve body to an opening at an intermediate wall portion of said reduced portion of said stepped bore, wherein said discharge port communicates with said inlet opening when said second piston is translated a given distance toward said first piston in response to the output pressure of said pump exceeding a given maximum value.

2. The control valve according to claim 1, wherein the diameter of said axial bore of said first piston is substantially equal to the diameter of said reduced portion of said stepped bore.

3. The control valve according to claim 1, including a fourth passageway coupling said restricted opening of said stepped bore to a second opening in a wall portion of said stepped bore between said opening at said intermediate portion of said stepped bore and said reduced portion of said stepped bore.

4. The flow control valve according to claim 3, including:
    a pressure accumulating reservoir coupled to the output of said first delivery port,
    a one-way check valve in said first passageway and connected between said first delivery port and the connection of said fourth passageway to said restricted opening of said stepped bore to provide unidirectional flow toward said reservoir; and,
    a three-way, two position directional valve having first, second and third ports leading from a common chamber thereof and respectively coupled to said restricted opening of said stepped bore, said second opening and said discharge port, said directional valve being responsive to the pressure levels in said reservoir to open said first and second ports while closing said third port when the pressure in said reservoir falls below a given value and to open said second and third ports while closing said first port when the pressure in said reservoir exceeds said given value.

5. The flow control valve according to claim 4, wherein said directional valve includes a ball valve responsive to the movement of an adjacent piston and wherein said piston is slidably mounted within a chamber which communicates with said reservoir at one end of said adjacent piston and wherein said adjacent piston is operatively coupled to said ball valve at its other end thereof.

6. The control valve according to claim 1, including a fourth passageway coupling said first delivery port to said discharge port and including a pressure relief valve which closes said fourth passageway until the pressure at said first delivery port exceeds a predetermined value whereupon said first delivery port communicates with said discharge port.

7. The control valve according to claim 1, wherein said means for urging said pistons away from each other comprises a governor spring coaxially disposed about said first piston between the transition portion of said stepped bore and an axially outwardly facing portion of said first piston.

8. The control valve according to claim 7, wherein said means for urging said pistons away from each other further comprises a spring disposed in said axial bore of said first piston between the inner end of said other portion of said stepped bore and an axially inwardly facing portion of said second piston.

* * * * *